(12) United States Patent
Silver et al.

(10) Patent No.: US 7,957,554 B1
(45) Date of Patent: Jun. 7, 2011

(54) METHOD AND APPARATUS FOR HUMAN INTERFACE TO A MACHINE VISION SYSTEM

(75) Inventors: William Silver, Weston, MA (US); Robert Shillman, Weston, MA (US); Aaron Wallack, Natick, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 1407 days.

(21) Appl. No.: 10/335,829

(22) Filed: Dec. 31, 2002

(51) Int. Cl.
*G06K 9/00* (2006.01)
(52) U.S. Cl. ........................................ 382/103; 382/153
(58) Field of Classification Search .................. 382/103, 382/153; 356/73.1, 147
See application file for complete search history.

(56) References Cited

U.S. PATENT DOCUMENTS

| | | | |
|---|---|---|---|
| 4,423,936 A | 1/1984 | Johnson | |
| 4,825,058 A | 4/1989 | Poland | |
| 4,825,394 A * | 4/1989 | Beamish et al. | 356/147 |
| 4,861,972 A | 8/1989 | Elliott et al. | |
| 4,866,257 A | 9/1989 | Elliott et al. | |
| 4,877,949 A | 10/1989 | Danielson et al. | |
| 5,308,966 A | 5/1994 | Danielson et al. | |
| 5,378,883 A | 1/1995 | Batterman et al. | |
| 5,521,366 A | 5/1996 | Wang et al. | |
| 5,572,006 A | 11/1996 | Wang et al. | |
| 5,627,360 A | 5/1997 | Rudeen | |
| 5,646,390 A | 7/1997 | Wang et al. | |
| 5,734,153 A | 3/1998 | Swartz et al. | |
| 5,756,981 A | 5/1998 | Roustaei et al. | |
| 5,773,810 A | 6/1998 | Hussey et al. | |
| 5,783,811 A | 7/1998 | Feng et al. | |
| 5,793,033 A | 8/1998 | Feng et al. | |
| 5,815,200 A | 9/1998 | Ju et al. | |
| 5,825,006 A | 10/1998 | Longacre, Jr. et al. | |
| 5,834,754 A | 11/1998 | Feng et al. | |
| 5,900,613 A | 5/1999 | Koziol | |
| 5,929,418 A | 7/1999 | Ehrhart | |
| 5,932,862 A | 8/1999 | Hussey | |
| 5,949,057 A | 9/1999 | Feng | |
| 5,965,863 A | 10/1999 | Parker et al. | |
| 5,992,751 A | 11/1999 | Laser | |
| 6,138,914 A | 10/2000 | Campo et al. | |
| 6,308,006 B1 | 10/2001 | Yamamoto et al. | |
| 6,340,114 B1 | 1/2002 | Correa et al. | |
| 6,347,163 B2 | 2/2002 | Roustaei et al. | |
| 6,505,728 B1 | 1/2003 | Dion | |
| 6,527,183 B2 | 3/2003 | Bard et al. | |
| 6,578,766 B1 | 6/2003 | Parker et al. | |

(Continued)

OTHER PUBLICATIONS

GestureTek, Product Solutions, Gesturetek Xtreme Software, description at http://www.gesturetek.com/gestxtreme/gestxtreme_software.php, (Sep. 28, 2007), 1-3.

(Continued)

*Primary Examiner* — Duy M Dang (57) ABSTRACT

An apparatus and method are disclosed for setting up a vision system having a camera and a vision processor cooperative with the camera. The apparatus includes a gesture recognizer, a key recognizer, a breakout box having at least two signaling elements, and a setup control unit that is cooperative with the gesture recognizer, the key recognizer, and the breakout box. The combination of using a key and a gesture set as herein described is substantially superior, as compared with known user interfaces for setting up a vision system that has been previously been engineered, in terms of low-cost, convenience, ease-of-use, simplicity, and speed.

15 Claims, 6 Drawing Sheets

U.S. PATENT DOCUMENTS

| | | |
|---|---|---|
| 6,629,642 B1 | 10/2003 | Swartz et al. |
| 6,636,298 B1 * | 10/2003 | Bachelder et al. ............ 356/73.1 |
| 6,651,886 B2 | 11/2003 | Gurevich et al. |
| 6,651,888 B1 | 11/2003 | Gurevich et al. |
| 6,677,852 B1 | 1/2004 | Landt |
| 6,681,031 B2 * | 1/2004 | Cohen et al. .................. 382/103 |
| 6,681,994 B1 | 1/2004 | Koenck |
| 6,712,270 B2 | 3/2004 | Leach et al. |
| 6,729,546 B2 | 5/2004 | Roustaei |
| 6,776,342 B1 | 8/2004 | Thuries |
| 6,808,114 B1 | 10/2004 | Palestini et al. |
| 6,829,371 B1 | 12/2004 | Nichani et al. |
| 6,832,725 B2 | 12/2004 | Gardiner et al. |
| 6,866,198 B2 | 3/2005 | Patel et al. |
| 6,877,664 B1 | 4/2005 | Oliva et al. |
| 6,918,538 B2 | 7/2005 | Breytman et al. |
| 6,920,241 B1 | 7/2005 | Dutta-Choudhury et al. |
| 6,931,602 B1 | 8/2005 | Silver et al. |
| 6,959,871 B1 | 11/2005 | Herrod et al. |
| 6,974,085 B1 | 12/2005 | Koenck |
| 6,997,385 B2 | 2/2006 | Palestini et al. |
| 7,007,843 B2 | 3/2006 | Poloniewicz |
| 7,055,747 B2 | 6/2006 | Havens et al. |
| 7,058,204 B2 | 6/2006 | Hildreth et al. |
| 7,073,715 B2 | 7/2006 | Patel et al. |
| 7,075,663 B2 | 7/2006 | Canini |
| 7,077,321 B2 | 7/2006 | Longacre, Jr. et al. |
| 7,080,786 B2 | 7/2006 | Longacre, Jr. et al. |
| 7,104,456 B2 | 9/2006 | Parker et al. |
| 7,124,948 B2 | 10/2006 | Longacre, Jr. et al. |
| 7,124,951 B2 | 10/2006 | Hamilton et al. |
| 7,147,159 B2 | 12/2006 | Longacre et al. |
| 7,227,526 B2 | 6/2007 | Hildreth et al. |
| 7,296,749 B2 | 11/2007 | Massieu |
| 7,305,114 B2 | 12/2007 | Wolff et al. |
| 7,387,246 B2 | 6/2008 | Palestini et al. |
| 2003/0001018 A1 | 1/2003 | Hussey et al. |
| 2003/0019934 A1 | 1/2003 | Hunter et al. |
| 2003/0062413 A1 | 4/2003 | Gardiner et al. |
| 2006/0278715 A1 | 12/2006 | Hamilton et al. |
| 2007/0057067 A1 | 3/2007 | He |
| 2007/0170259 A1 | 7/2007 | Nunnink et al. |

OTHER PUBLICATIONS

Press Release, Virtual Reality Industry Pioneer is give the Lifetime Achievement Award at the 2003 Canada New Media Awards, Toronto, Canada, downloaded at http://www.gesturetek.com on Sep. 28, 2007, (Jun. 6, 2003).

Yang, Ming-Hsuan et al., "Face Detection and Gesture Recognition for Human-Computer Interaction", Kluwer Academic Publishers, (Jan. 2001).

Burkhardt, Jochen et al, "Pervasive Computing: Technology and Architecture of Mobile Internet Applications", Pearson Education Limited, (Nov. 2001).

"Proceedings of the Fifth International Conference on Automatic Face and Gesture Recognition", Washington, D.C., May 20-21, 2002 (Software—Sep. 2002).

* cited by examiner

METHOD AND APPARATUS FOR HUMAN INTERFACE TO A MACHINE VISION SYSTEM

FIELD OF THE INVENTION

This invention relates to machine vision systems, and particularly to user-interfaces for set-up and/or control of machine vision systems.

BACKGROUND OF THE INVENTION

Typically, a machine vision system is created by a developer at the developer's location, but usually must be set-up by a customer at a later time at the customer's site. Upon moving the system to a new location for deployment, the system must be set up again, as originally configured by the developer, and typically by someone less technically sophisticated than the developer. First, the camera must be mounted, and the camera must be adjusted over five degrees of freedom (focus, aperture, (x,y,z) position of camera).

The known ways of re-establishing the set-up involve some sort of human-machine interface (HMI) that involves: getting an image on a monitor, adjusting light level by adjusting the aperture or the illumination until the image looks good, adjusting the focus by turning the focus ring on the camera until the image looks in-focus, adjusting (x,y,z) position by moving the camera so as to ensure that the image includes all objects and/or markings of interest. The output of the vision system is an image of the object to be inspected, and the input might be from a mouse or a keyboard, or any other standard element of an HMI. This is by far the most common way of setting up a machine vision system.

Methods for automatically adjusting light level, focus, and (x,y,z) position are known. For example, there are methods for performing automatic gain control in cameras to obtain correct light levels. However, these known methods do not have infinite dynamic range, and so the user must manually determine the range of f-stops within which the aperture will be automatically adjusted. Also, there are auto-focus systems in many cameras. However, such auto-focus systems are not found in machine vision systems because of their high expense, and the fact that they would only be used at set-up time, but not at run time. This is because a constant camera-to-subject distance is used, and if there's not a constant camera-to-subject distance, there's typically not enough time to make focal adjustments automatically during rapidly moving industrial processes, where only a single image of an object may be captured for analysis. Further, auto-focus systems are extremely unlikely to be found in inexpensive machine vision systems, due to the high cost of auto-focus systems.

Also, X-Y-Z positioning is usually done manually by an installer or a technician.

A monitor of the typical HMI is heavy and consumes a lot of power, and is commonly the most heavy and power consuming component of a vision system. By contrast, it is possible for a computer that solely runs vision applications to operate without a monitor, and consequently it can be quite small and consume very little power, enabling it to easily obtain power solely from a 12-V battery. Yet, to provide a graphical user interface (GUI) for facilitating set-up, you need a PC or a laptop, which adds further cost, weight, and power consumption to a vision system.

SUMMARY OF THE INVENTION

The invention enables a user to set up, control, an/or configure a machine vision system with a minimum amount of physical hardware, consequently minimizing system cost while substantially increasing ease-of-use. By eliminating the need for a GUI that requires a monitor, keyboard, and pointing device (such as a mouse, or track-ball, for example), the invention facilitates substantially reduced power requirements, reduced system cost, increased system portability, and substantially increased ease-of-use.

In one general aspect of the invention, an apparatus and method are provided for setting up a vision system having a camera and a vision processor cooperative with the camera. The apparatus includes a gesture recognizer adapted to monitor gestures in a field of view of the camera, and to provide control information in accordance with the gestures to the vision system. The apparatus also includes a key recognizer adapted to monitor a key in a field of view of the camera and provide key information to the vision system. Further, the apparatus includes a breakout box having at least two signaling elements, one of the two signaling elements communicating MODE information, and another of the two signaling elements communicating VALUE information. A setup control unit is cooperative with the gesture recognizer, the key recognizer, and the breakout box, the setup control unit being adapted to use gesture control information and key information to adjust a plurality of setup degrees of freedom, and adapted to provide MODE and VALUE information to the breakout box.

In a preferred embodiment, the plurality of setup degrees of freedom are adjusted in a predetermined sequence.

In another preferred embodiment, the gestures in a field of view of the camera include: a hand moving right-to-left; a hand moving left-to-right; and a hand placed so as to substantially block the field of view of the camera.

In yet another preferred embodiment, the gestures in a field of view of the camera include: a wand moving right-to-left; a wand moving left-to-right; and a hand placed so as to substantially block the field of view of the camera.

In some embodiments, the signaling elements are light emitting diodes (LEDs). In other embodiment, the signaling elements are audible tone emitters. In yet other embodiment, the signaling elements are numeric displays.

In another general aspect of the invention, a method is provided for programming a vision system. The method includes providing a user manual that includes a data symbol alongside a description of the mode of set-up or mode of operation, and then placing the bar code from a page in the manual in the field of view so as to cause the vision system to enter the mode or perform the operation described by the text alongside the bar code symbol.

In a preferred embodiment, is a bar code symbol or a data matrix symbol.

In another general aspect of the invention, a method is provided for training a vision system. The method includes communicating a region of interest to the vision system using a key that graphically indicates the contours of the region of interest to the vision system.

In a preferred embodiment, the training key is manually drawn. The training key can be selected from a set of training keys, the set of training keys possibly being included in a users manual, or in a deck of flash cards.

In another general aspect of the invention, an apparatus is provided for setting up a vision system having a camera and a vision processor cooperative with the camera. The apparatus includes a signaling element, communicating at least VALUE information as feedback to a user as the user adjusts a degree of freedom of the camera. The degree of freedom of the camera can be focus or aperture.

To set up a vision system without a time-consuming or complicated GUI and the associated heavy and expensive monitor, the invention provides a way for the vision system to communicate with user so as to enable adjustment of five degrees of freedom (focus, aperture, (x,y,z) position of camera), and also provides a way to instruct the vision system to perform a vision task.

The combination of using a key and a gesture set as herein described is substantially superior, as compared with known user interfaces for setting up a vision system that has been previously been engineered, in terms of low-cost, convenience, ease-of-use, simplicity, and speed.

Thus, the combination of using a key and a gesture set of the invention is ideally suited to setting up a large number of pre-engineered systems in a factory.

BRIEF DESCRIPTION OF THE DRAWING

The invention will be more fully understood by reference to the detailed description, in conjunction with the following figures, wherein.

DETAILED DESCRIPTION

Figure 1:
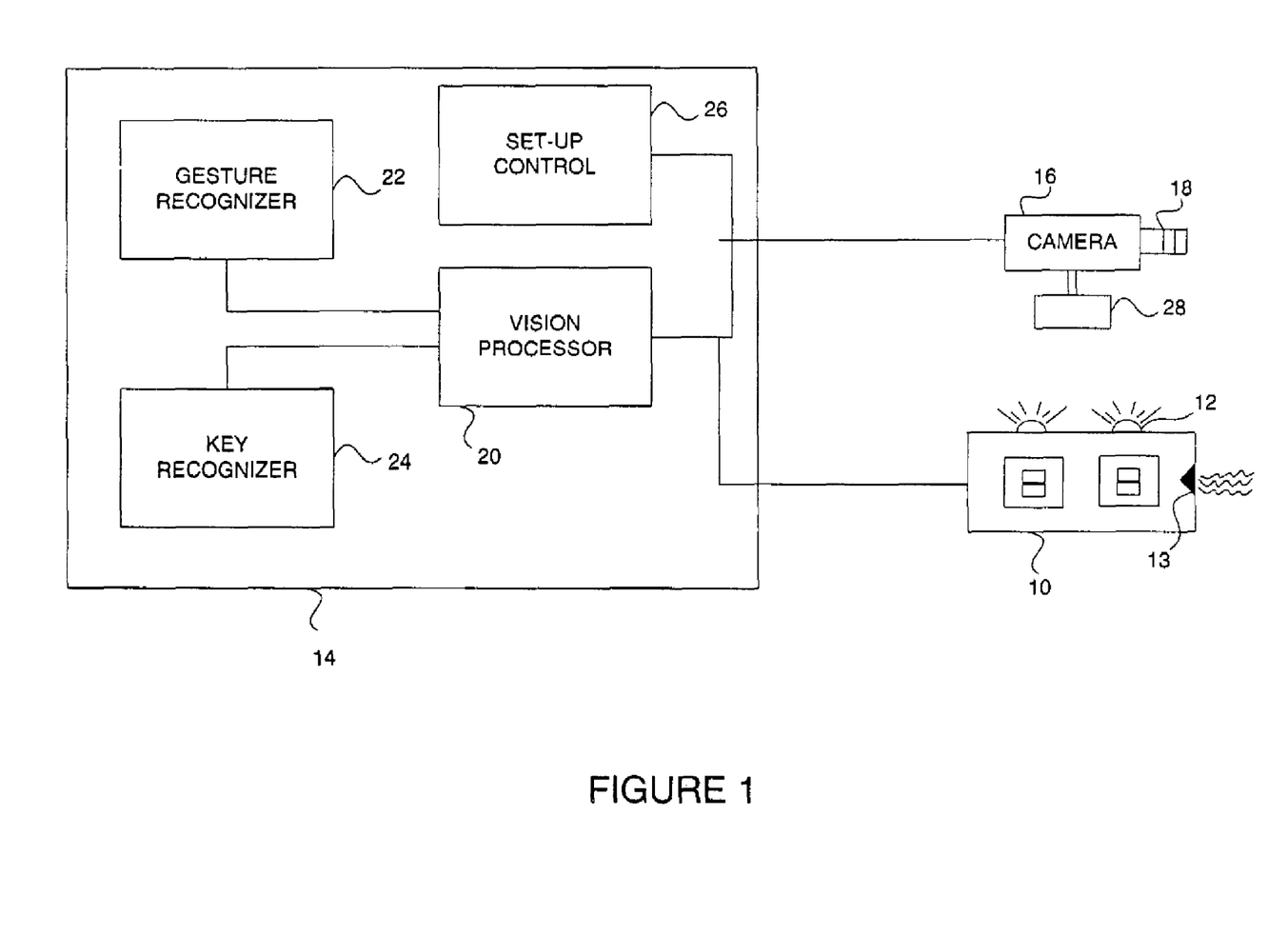
FIG. 1 is a schematic diagram of a vision system employing the method and/or apparatus of the invention.

Referring to FIG. 1, an illustrative embodiment includes a "break-out box" 10 having two light emitting diodes (LEDs) 12 for conveying information to a user, but having no inputs. The breakout box can also include a sound generator 13, such as a speaker, for communicating with a user via tones, such as beep tones.

An illustrative method of the invention uses the LEDs 12 as follows: one LED 12 is the MODE LED, telling the user what mode the system is in, and the other LED 12 is the VALUE LED which outputs a number from zero to one. The MODE LED tells the user what mode the vision system is in by blinking a code: if blinking, then the vision system is in SET-UP mode, and if it's not blinking, the vision system is in RUN mode. Within SET-UP mode, there are five SET_UP modes corresponding to the five degrees of freedom that must be adjusted.

Also included in the illustrative embodiment of FIG. 1 is a vision system 14 connected to the breakout box 10, and a camera 16 connected to the vision system 14, the camera having a lens 18. In other arrangements, the vision system 14 can be incorporated within the housing of the camera 16, or within the breakout box 10.

The vision system 14 includes a vision processor 20 for executing vision tasks, such as the typical image processing, analysis, and interpretation tasks of known vision systems. Also included is a gesture recognizer 22, a key recognizer 24, and a set-up control 26.

The gesture recognizer processes images provided by the camera 16. These images may or may not be the same images processed by the vision processor 20. To increase efficiency by introducing parallel processing, some embodiments provide every other image to the gesture recognizer 22 and to the key recognizer 24, the rest of the images being concurrently processed by the vision processor 20. In other embodiments, each image is provided to both the vision processor 20, and to the gesture recognizer 22 and key recognizer 24. In yet further possible embodiments, acquired images are provided only to the gesture recognizer 22 and the key recognizer 24 until a gesture or key in the field of view of the camera 16 initiates redirecting of images to the vision processor 20, under the control of the set-up control unit 26.

The set-up control unit 26 receives input from the gesture recognizer 22 and the key recognizer 24, and controls the adjustment of the lens 18, the settings of the camera 16, such as the aperture setting and/or shutter speed. The set-up control 26 also controls a motion stage 28 that serves to position the camera 16 by varying at least three degrees of freedom: x-position, y-position, and z-position (height). The motion stage 28 can also vary angular degrees of freedom (pitch, yaw, and roll). The control flow of the set-up unit 26 is described in more detail below with reference to FIGS. 5 and 6. In an alternate embodiment, the camera is fixed or adjusted manually, and motion state 28 is not present.

The gesture recognizer 22 can use a wide variety of different gesture recognition algorithms, as are well-known in the art, and as cited below. To simplify the gesture recognition task, a wand can be used instead of a hand. Alternatively, a hand can be used with a glove bearing markings and/or coloration selected to enhance gesture recognition, and thereby simplify the recognition task.

The key recognizer 24 can respond to a wide variety of keys. Keys include bar code symbols, data matrix symbols, and other 2-dimensional data symbols. A key can also be for purposes of enhanced camera adjustment, such as a universal alignment target (UAT), as further explained below. Additionally, a key can be hand-made drawings indicating regions of interest, and providing annotations, such as dimensions, angular extents, and parameters, for example. Generally, a key is any graphical information presented to a vision system, such as within the field of view of the vision system, that that can be used to control, operate, adjust, parameterize, or set-up a vision system.

It is also possible to employ auditory keys, such as spoken commands, or commands issued with a small tone-generator. Spoken commands could include "set-up" to initiate a set-up command sequence, and "stop" to stop a run-time operation. To simplify or eliminate the need for voice recognition, simple beep tones can be issued where commands are encoded using alternating long and short beep tones, for example. In this alternate embodiment, a microphone (not shown) is incorporated in the breakout box 10, as well as audio processing and/or speech recognition software.

Figure 2:
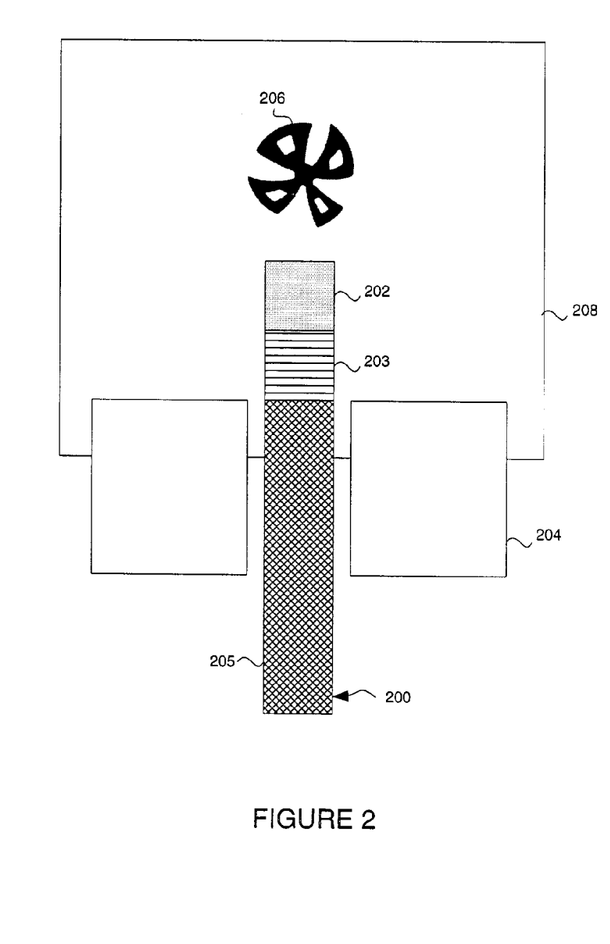
FIG. 2 is an top-view of a pencil inspection station having a good pencil in position to be inspected.

With reference to FIG. 2, an illustrative embodiment of the invention is used to inspect a pencil 200 to see whether an eraser 202 is present, and if it is present, whether it is a "good" eraser. Upon placing a pencil 200 to be inspected in the fixture 204, the system will say: "good", or "not good". If there is no pencil in place within the fixture 204 to be inspected, the system will say "nothing there" (i.e., no trigger given). The system is always running . . . always in a continuous loop operating at a rate of approximately twenty frames per second. Every frame, or sequence of frames, it makes a decision as to whether there a pencil there or not, and if so (pursuant to a trigger), then the pencil 200 will be inspected to decide whether it's "good" or "not good". There's a three state output, and the output is continuously provided.

Visible within a field of view of the camera 16, along with at least a portion of the pencil 200, is a UAT 206 that may have been used for set-up of the system 14 and/or camera 16. The UAT 206 can also be used for calibrating distance and width measurements, for example.

Two essential things are needed to set up a vision system without using a monitor: means for enabling the vision system to provide image quality feedback to a user, such as means for enabling the vision system to tell the user what is going on in each of five degrees of freedom, for example; and means for the user to instruct the machine vision system to perform a task. An example of a simple inexpensive output module consists of two light emitting diodes (LEDs). A slightly more expensive output module includes two seven-segment displays for displaying numeric characters, or alpha-numeric characters.

A method of the invention uses the LEDs as follows: one LED is the MODE LED, telling the user what mode the system is in, and the other LED is the VALUE LED which outputs a number from zero to one. The MODE LED tells the user what mode the vision system is in by blinking a code: if blinking, then the vision system is in SET-UP mode, and if it's not blinking (steady on), the vision system is in RUN mode. Within SET-UP mode, there are five SET-UP modes corresponding to the five degrees of freedom that must be adjusted in the illustrative embodiment. For example, when in SET-UP mode, the MODE LED blinks once per cycle to indicate that the vision system is in SET-UP mode 1, twice per cycle to indicate that the vision system is in SET-UP mode 2, and so forth.

Using only a single LED to indicate mode might limit the number of modes to the number of blinks that a user could conveniently count each blink cycle, such as about ten blinks per blink cycle. Alternatively, a single seven-segment display would communicate one of ten modes at a glance by blinking once per blink cycle, or one of one hundred modes by alternately displaying a digit of a two-digit mode from 0 to 99, for example, once per blink cycle. Also, a pair of seven-segment display elements could display a two-digit mode number at a glance once each blink cycle.

Alternatively, a single bi-color LED could be used to communicate the MODE in red, and the value in green. Or, two bi-color LEDs could be used, a first bi-color LED encoding mode using a pattern of green and red illumination, and a second bi-color LED encoding value using a pattern of green and red illumination.

To display a value between 0 and 1, the duty cycle of a blinking LED is used. For example, an LED blinking at one hertz (HZ) (one cycle per second), with a duty cycle of 0.5, is ON half of each blink cycle and OFF half of each blink cycle, representing a value of 0.5. When a user sees that the LED always OFF, the duty cycle is 0, representing a value of zero. When the user sees that the LED is always ON, the duty cycle is 1, representing a value of one. If the LED is ON 80% of each blink cycle, and OFF 20% of each blink cycle, that represents a value of 0.8. Of course, all values between 0 and 1 can be represented by controlling the duty cycle accordingly.

An advantage of this method of displaying value is that a user can get a subjective sense of the value by casually observing the duty cycle. For example, always ON, always OFF, and half ON/half OFF are easy to sense subjectively. A user can also tell when a duty cycle is increasing or decreasing, and consequently when the value is increasing or decreasing. Thus, using duty cycle to represent value allows a user to know when one of those easily perceived values (0, 0.5, 1.0) is present, and to know how to adjust the value with reference to those easily perceived values. Thus, two LEDs can be used to represent two numbers: MODE and VALUE.

Figure 3:
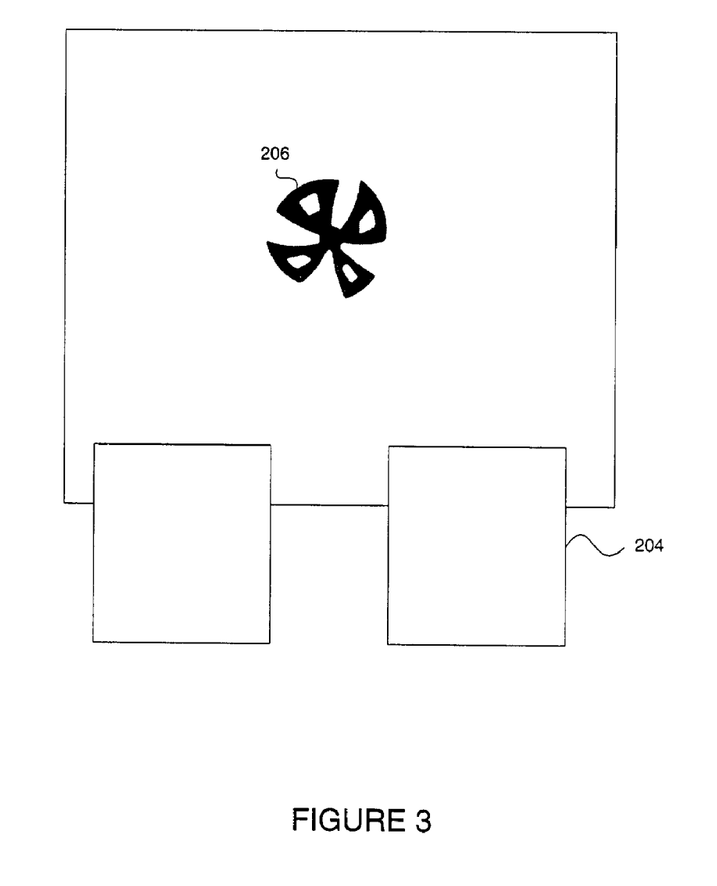
FIG. 3 is a top-view of a pencil inspection station having no pencil in position to be inspected.
Figure 4:
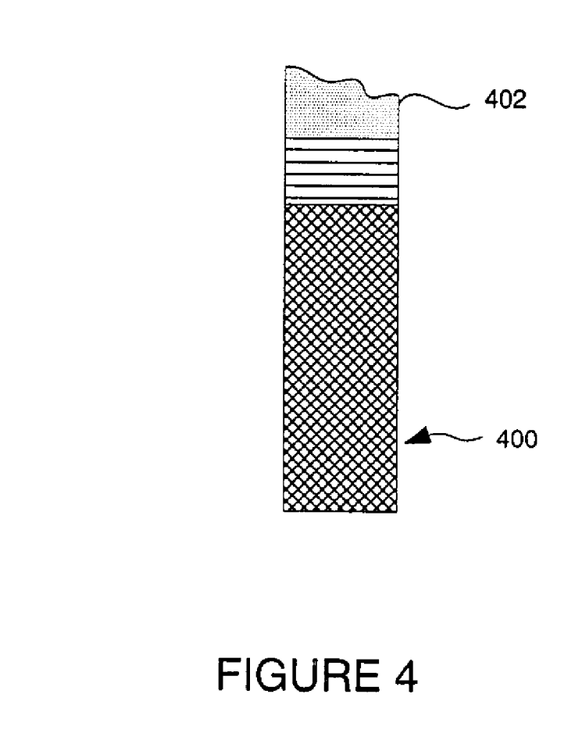
FIG. 4 is an example of a bad pencil.

In the exemplary embodiment of FIG. 2 (showing the pencil inspection), in RUN mode, the values displayed by the VALUE LED are 0, 0.5, and 1.0, using duty cycle as explained above. A value of 0.5 means that there is no pencil present, as shown in FIG. 3. A value of 0 means that there is a pencil present 400, but it is not acceptable, since it has a defective eraser 402, as shown in FIG. 4. A value of 1 means that there is a pencil present, and it is acceptable.

In each of the SET-UP modes, the value represents how well each respective degree of freedom is adjusted, where a value of 1 represents substantially perfect adjustment, and a value of 0 represents maximum maladjustment of the degree of freedom. Thus, to set up the vision system 14, the user enters each SET-UP mode, and adjusts the respective degree of freedom until the VALUE LED goes from blinking to a continuous ON state, i.e., a value of 1.0, representing substantially perfect adjustment of that degree of freedom. The user can observe how much adjustment is needed by comparing the perceived duty cycle relative to 0.0 and 0.5 and 1.0, and that degree of freedom can then be adjusted sufficiently so as to move towards perfect adjustment, indicated by a concomitant increase in the duty cycle of the VALUE LED towards a continuous ON state. Further observation of changes in the duty cycle of the VALUE LED indicate to the user when the adjustment of the degree of freedom is getting better or worse.

In the exemplary embodiment having a particular mechanical configuration, the order of adjustment of the degrees of freedom is important. For example, it is advantageous to adjust the degrees of freedom in this order: Aperture, Focus, Z-position (height), X-position, and Y-position. In this application, the order of X-position, and Y-position could equivalently been reversed.

In general, adjustment of a degree of freedom must not affect the adjustment of a previously adjusted degree of freedom. It is acceptable for adjustment of a degree of freedom to affect the adjustment of a subsequently adjusted degree of freedom. For example, adjusting Z-position might affect the X-position, and Y-position, so Z-position is adjusted before adjustment of X-position, and Y-position. Adjustment of X-position, and Y-position has no effect on Z-position.

To help the vision system 14 know when a degrees of freedom is adjusted, a "key" is used. In an illustrative embodiment, a key is any pattern for placement in the field of view of the vision system that provides enabling or operational information to the vision system. The pattern can be a reference pattern, a fiducial, an alignment target, or a data symbol, for example. The data symbol can be a bar code or data matrix code, for example. The pattern can provide information to the vision system that can be used to set up the vision system, to provide or deny access to the vision system, to provide control of the training phase of system operation, or to control the vision system while it is running.

A key can provide a fiducial with regions for enhanced contrast detection, such as the universal alignment target 206 (UAT) (as explained in detail in co-pending U.S. patent application Ser. No. 09/699,540 filed on Oct. 30, 2000, now U.S. Pat. No. 6,671,049, Ser. No. 09/699,590 filed on October 30, 2000, now U.S. Pat. No. 6,812,933, and Ser. No. 09/699,614 filed on Oct. 30, 2000, now U.S. Pat. No. 7,043,055), and/or regions with encoded data, such as bar codes and data matrix codes.

A key can be printed on a fixed background of a field of view, as shown in FIGS. 2 and 3, or a key can be printed on a "flash card" that can be manually placed in the field of view of the vision system by a user. It is also possible to project a key onto the fixed background of a field of view using a compact portable illuminator having a mask bearing the key pattern, for example. Any method for presenting a pattern that serves as a key is contemplated by the invention.

In the embodiment shown in FIGS. 2 and 3, a universal alignment target 206 (UAT) is used as a key. The UAT 206 is placed in a fixed position relative to where the pencils 200, 400 are entering the field of view 208 of the camera 16. The UAT 206 provides contrast in the scene, so that the APERTURE degree of freedom can be adjusted.

APERTURE is adjusted using automatic gain control that adjusts the exposure time of the digital camera of the vision system within the range of 0.5 milliseconds to 10 milliseconds, for example. As long as there is sufficient light impinging upon the area within the field of view having the UAT 206 such that the automatic gain control can establish an exposure within a range of 0.5 milliseconds to 10 milliseconds that is acceptable, then the APERTURE setting is deemed to be substantially perfect, and the VALUE LED indicates this state by staying on continually, i.e., not blinking with a duty cycle. If there is inadequate light to establish an exposure time within the range, then the VALUE LED blinks with a duty cycle that suggests an adjustment is needed.

FOCUS is adjusted using a key in the field of view, such as the UAT 206. Standard image processing methods are used to determine a relative degree of focus that is used as feedback to enable the vision system 14 to find an optimal focal setting of the lens 18 of the camera 16 of the vision system 14.

The UAT 206 is particularly effective for use as a key to facilitate focal adjustment because it has a clearly discernable shape, even when out of focus, because it's predominant features are broad or coarse. Even when fine features are blurred due to sub-optimal focus, the UAT 206 still looks like a UAT that is substantially in perfect focus. This is important because aperture control is performed before focal adjustment, i.e., while the key is out of focus. The UAT 206 provides a sufficiently robust contrast to enable aperture control, even when it is not yet in focus. Further, focusing is not possible if the aperture is not set correctly. So, the UAT 206 enables the required order of set up operations APERTURE and FOCUS. This is because, as focus degrades, the contrast of fine features degrades much more rapidly than the contrast of coarse or broad features.

Consequently, a bar code symbol would not be useful as a key to establish the correct APERTURE and FOCUS settings because bar code symbols have many fine features that would be difficult to detect when viewed by a camera that was out of focus, and would therefore not provide adequate contrast to adjust APERTURE.

Then, the X-, Y-, and Z-settings are adjusted using a pattern recognition system, such as PatFind™ pattern recognition software available from Cognex Corporation, Natick Mass., based upon a trained pattern, such as a trained UAT, as is well-known in the art. Other pattern recognition systems that could be used include PatMax™ pattern recognition software, available from Cognex Corporation, normalized correlation search, or blob analysis to determine size and x,y position. A pattern finder, such as PatFind™ or PatMax™ is preferable to blob analysis because blob analysis would not easily be able to know that an incorrect key was in the field of view, whereas a pattern finder can easily distinguish the correct key from an incorrect key, even in the context of a confusing background.

Gestures are used to change the mode of the system of the invention from SETUP modes 1,2,3,4,5, and RUN mode. Gestures are also used to transition from RUN mode back into SETUP mode. In addition to having the capability to perform inspection, measurement, and other typical vision tasks, the vision system 14 is capable of acting as an input device, replacing hardware and/or software input switches. The vision system 14 accomplishes this by detecting and recognizing gestures that represent commands to the vision system 14 to perform an operation, such as to change the mode of the system.

Gesture recognition algorithms and products are known, such as described in Face Detection and Gesture Recognition for Human-Computer Interaction, by Ming-Hsuan Yang, and Narendra Ahuja, January 2001, and Pervasive Computing: Technology and Architecture of Mobile Internet Applications by Jochen Burkhardt, Horst Henn, and Klaus Rindtorff, November 2001. Also, Proceedings of the Fifth IEEE International Conference on Automatic Face and Gesture Recognition: Washington, D.C., 20-21 May 2002 (Software—September 2002). Vivid Group in Canada sells a software product called GX Gesture Extreme software that tracks body parts.

The illustrative embodiment employs three gestures, i.e., hand motions (or wand motions; see below) in front of the camera 16 of the vision system 14. A gesture recognizer 22 is able to recognize three gestures: hand moving to left, hand moving to right, and hand over the lens 18. The gesture recognizer 22 for recognizing the three simple gestures could be implemented by one of average skill in the art using the information in one of the many references on gesture recognition now available on the web, or using publicly and/or commercially available gesture recognition software.

In an alternate embodiment, a wand can be used instead of a hand, the wand being waved in the field of view of the vision system to give commands to the system. The wand can be a stick with a bright sphere at one or at both ends. A bright sphere (white or red, for example) of a known dimension would be easily recognizable by the vision system. The sphere should be a color that is easily distinguished from the background, and from the objects to be inspected by the vision system. The wand could also be a plastic, metal, or wooden rod with an LED (or other light emitting device) at one or both ends. Using a wand would reduce the complexity of the gesture recognition task (using blob analysis, for example), and would reduce the computational time for gesture recognition.

The illustrative embodiment employs three simple gestures, but more gestures are possible, and may be needed in more complex applications. Up-to-down, and down-to-up can also be added to the gesture repertoire, for example. More complex movements may also be added, such as generally circular motion (clockwise and counterclockwise), diagonal motion, square or rectangular motion (to indicate a region of interest, for example), triangular motion, etc. The complexity of the gesture set will be commensurate with the complexity of the command set needed for a particular application.

Regarding the three simple gestures, moving a hand (or wand) from left-to-right means go up one mode (e.g., from mode 2 to mode 3), and moving a hand from right-to-left means go down one mode. The blinking MODE light 12 responds by blinking in a pattern that indicates the particular mode that the vision system is currently in, as discussed above. Auditory feedback can also be included using a sound generator 13, so that the system emits a "beep" tone when a gesture is recognized.

In addition, when the system is in MODE 5, and a hand gesture from left-to-right is executed, the system goes into RUN mode. While the system is in RUN mode, when a hand is placed over the lens 18 for a few seconds, the system reverts to SETUP mode.

The combination of using a key and a gesture set as herein described is substantially superior, as compared with known user interfaces for setting up a vision system that has been previously been engineered, in terms of low-cost, convenience, ease-of-use, simplicity, and speed.

Thus, the combination of using a key and a gesture set of the invention is ideally suited to setting up a large number of pre-engineered systems in a factory.

In alternate embodiments, both the gesture recognition and the keys used can be more sophisticated so as to enable more elaborate set-up procedures, and to enable training and runtime control.

For example, in accordance with the invention, a key can consist of, or can include, a two-dimensional matrix code and/or a bar code symbol. In the case of a UAT, for example, the UAT can include a data matrix code in its center, providing enhanced contrast for aperture adjustments, while also providing detailed information via the data matrix code.

In a case where there are fifty modes, a bar code representing one of the fifty modes is placed in the field of view of the vision system to place the vision system into that mode.

A particularly advantageous aspect of the invention involves a user manual that includes a bar code symbol (or data matrix symbol) alongside a description of the mode of set-up or mode of operation. In this case, the user places the bar code from a page in the manual in the field of view to cause the vision system to enter the mode or perform the operation described by the text alongside the bar code symbol. Thus, the vision system can "read" the manual and operate accordingly, vastly reducing the effort required for the user to operate the vision system.

Alternatively, the application program can be encoded in the data symbol (e.g., bar code symbol or data matrix symbol), and that encoded program, when shown to the vision system, can then be run by the vision system as an application.

Other uses for a "key" include communicating the identity of the user to the vision system, which then logs the user into the system and keeps a record of the user's activity. The vision system also maintains an authorized user list, and if the identity of the user does not match one of the names on the list, then the vision system may deny access. Alternatively, "password" gesture can be used to gain access to the system, such as a particular sequence of right-left and up-down movements.

Another important phase of the operation of a vision system is called "training". During training, the user communicates to the vision system information about an object to be inspected, and/or information regarding how the user wants the vision system to inspect the object. Training can involve creating a template that represents a good part, or can involve creating a region of interest in an image for directing the attention of the vision system 14, for example.

In one example of training, a region of interest is defined. Typically, defining a region of interest involves using a mouse or a track ball to draw a box on the screen. The user may also indicate that in a particular region of interest, a particular vision too, such as a caliper tool must be used. In another region of interest, another tool may be specified, along with parameters of operation for the vision tool.

Figure 7:
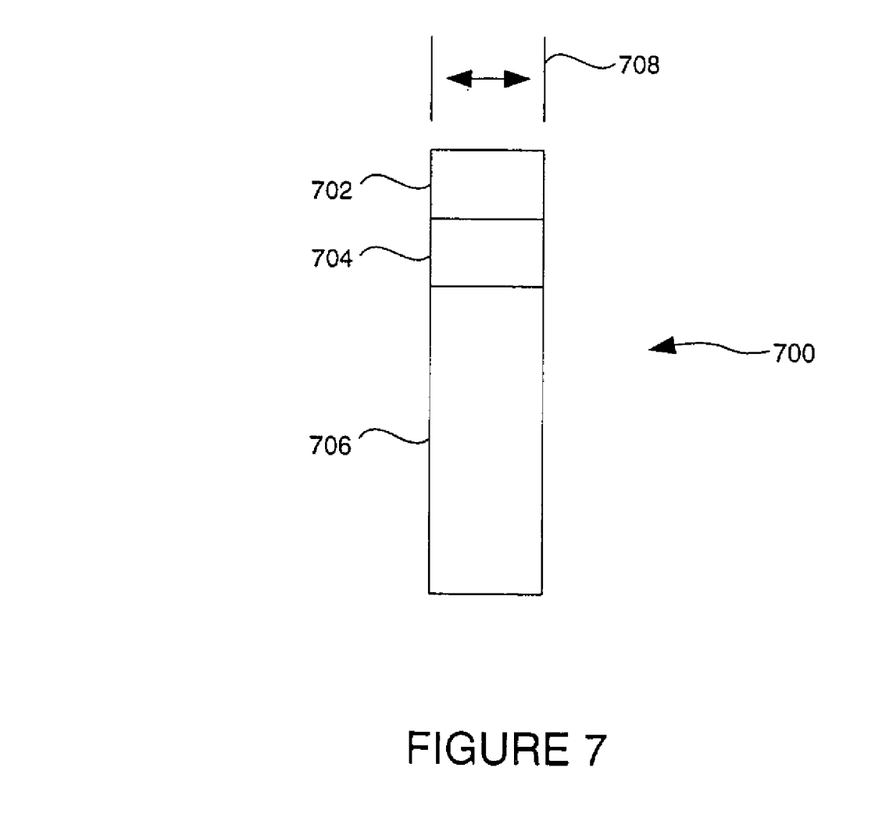
FIG. 7 is a schematic showing a plurality of regions of interest for guiding an inspection of a pencil of FIGS. 2, 3, and 4.

With reference to FIG. 7, according to the invention, a region of interest can be communicated to the vision system using a key that graphically indicates the contours of the region (or regions 702, 704, 706) of interest to the vision system 14. The training key 700 can be manually drawn, or can be selected from a set of training keys, such as might be included in a users manual, for example. In an exemplary embodiment, a region of interest training mode key is shown to the vision system 14 prior to showing the region of interest training key that contains the information regarding the region of interest. Alternatively, a gesture can be made in the field of view of the vision system prior to showing the region of interest key. A run mode key is then shown to the vision system to place the vision system into run mode. Also, a hand gesture can be used instead of a key to take the vision system into run mode.

Alternatively, a generic training mode key is shown to the vision system, and then a particular training mode key is presented that instructs the vision system 14 to interpret the next object presented to the vision system as a region of interest key. In another embodiment, a data symbol is included with the region of interest key, so that the data symbol instructs the vision system to regard the image in the field of view as including region of interest training information.

Referring to FIG. 7, a region of interest is drawn using a conventional pen to indicate the regions of interest for inspecting the pencil of FIGS. 2 and 4. It is significantly advantageous that a monitor is not needed to create the regions of interest, nor is a mouse, trackball, joystick, or other input device used to communicate the region of interest to the vision system.

The regions of interest in the example of FIG. 7 are selected to limit the computation of the vision system to the pixels that convey information about the eraser 202, 402, the metal band 203, and the painted portion 205. Thus, the regions of interest 702, 704, 706 represent a "schematic" of the object to be inspected; in this case, the pencil 200, 400. The annotation 708 indicates a critical dimension that is to be measured.

The schematic 700 of FIG. 7, including the contours bounding the regions of interest 702, 704, 706, is used to automatically create an inspection routine. The vision system is first presented with the schematic 700, and the vision system analyzes the schematic to extract the regions of interest. Then, the vision system 14 is presented with the object (e.g., the pencil 200, 400), resulting in an image of the object. The image of the object is then compared with the image of the schematic to determine what in the image of the object corresponds to relevant portions of the schematic, such as the regions of interest 702, 704, 706 that indicate the eraser 202, 402. Hough transforms (or chained edge lists), for example, can then be used to automatically create an inspection routine based on knowing what part of each acquired image is important (from the schematic 700), and knowing what an object to be inspected should look like (from the image of the original object). In addition, for some inspections, images of bad sample objects are also presented to the vision system for use in creating an inspection routine.

The schematic is useful in that it allows a user (even a user substantially unfamiliar with machine vision programming) to easily tell the vision system what is important in an image, thereby potentially saving the vision system from performing many unnecessary calculations and operations. Thus, by drawing a schematic, the user is performing feature selection for use by the vision system. The selected features serve as discriminants for input into a supervised learning pattern classification system as are found in abundance in the prior art, based either on neural nets or on nearest neighbor pattern classifiers, for example.

In a further exemplary embodiment, various colored pens can be used to create the schematic. For example, a blue pen is used to indicate features of interest in the image of the object, and a red pen is used for making annotations to indicate dimensions 708, distances, parameter settings, or regions of high interest, for example.

The key and gesture interface method of the invention is a way of getting information to the vision system without the standard monitor mouse keyboard switches, where the vision system itself is the input device, the vision system being able to see and recognize objects, and thereby a user can communicate a lot of information to the vision system without being a computer specialist.

Output to the user can be similarly simple, involving a little as two LEDs for communicating simple information inexpensively to the user.

Minimum configuration of the vision system 14 and camera 16: sensor, vision processor (CPU, memory, I/O (all on one chip possibly)). Thus, the vision system 14 can be quite small and inexpensive. Commodity parts can be used to create a fully functional system according to the invention. In fact, the entire vision system can reside within the housing of the camera 16, or the breakout box 10.

Figure 5:
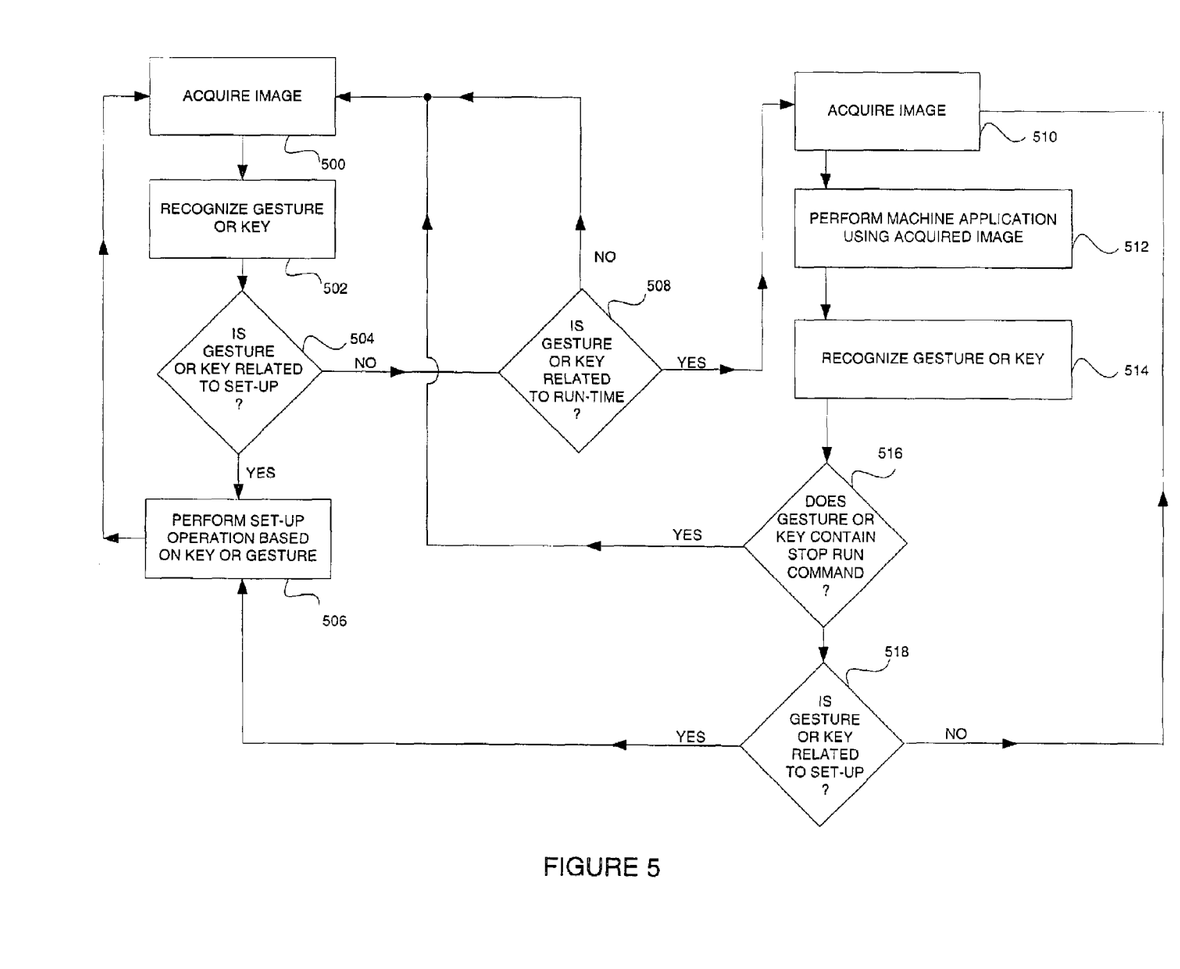
FIG. 5 is a flow chart of an operation sequence of the control unit of FIG. 1.

With reference to FIG. 5, in an illustrative embodiment, the vision system acquires an image 500 of the scene at the rate of 20 frames per second. Other acquisition rates can also be used, depending on the application and available hardware. Upon each image acquisition, the system looks for the presence of a key in the field of view, and also looks for gestures in the field of view 502. In an alternative embodiment, the system looks for the presence of a key or gesture every N frames, where N depends on the application. In applications where processing power is limited, due to a computationally intensive vision algorithm and/or a fast-moving manufacturing process, N can advantageously be set to 2, 5, 10, or 20, for example.

In a preferred embodiment, a sequence of image frames is used to recognize a gesture, such as a hand (or wand) moving from right to left, left to right, top to bottom, or bottom to top in the field of view. A gesture can also be a hand or card placed over the lens of the camera of the vision system that serves to effectively block the view of the scene and substantially darken the field of view. Alternatively, a single image frame can be used to recognize a gesture, such as a hand signal, using one of the gesture recognition products available on the market, as mentioned above.

In another preferred embodiment, a key recognizer 24 looks for the presence of a key in the field of view upon the acquisition of each frame. Alternatively, to save processing time, the key recognizer 24 looks for the presence of a key in the field of view 208 less frequently. For example, it saves processing time to look for the presence of a key in the field of view only once every 5, 10, 20, or 40 frames.

At step 504, the system acts on the decision as to whether the image or recent sequence of images includes a recognized gesture or key that relates to set-up. If a known key or gesture does relate to set-up, then the system performs the set-up operation specified by the key or gesture that was detected 506. For example, if a right-to-left hand motion is detected, the mode of the system changes. For example if the system was in the last stage of set-up, such a hand motion would place the system into run mode. If the system is in run mode, and a hand is placed over the lens of the camera of the vision system, the vision system would exit run mode. Alternatively, if a rapid sequence of right-to-left-to-right hand motions are detected, a system in set up mode would adjust a selected degree of freedom (e.g., aperture, focus, height, x-position, or y-position) by counting the number of such motions, for example.

If the gesture or key does not relate to a set-up operation, relates to a run-time operation, then the system determines whether the key or gesture relates to a run-time operation 508. If the key or gesture does not relate to a run-time operation, control returns to acquiring another image 500. Alternatively, control can pass to another stage where other classes of keys and gestures are checked.

If the key or gesture does relate to a run-time operation, an image or image sequence is captured 510 for use by a machine vision application that executes image processing, analysis, and/or interpretation, for example. Then, a machine vision application uses the image to perform the application 512.

Next, the system looks for the presence of a key or gesture in the field of view 514. At step 516, the system acts on the decision as to whether the image or recent sequence of images includes a recognized gesture or key that includes a stop-run command.

If the key or gesture relates to a stop-run command, then control is passed to the portion of the control flow relating solely to set-up, and another image is acquired solely for key or gesture recognition 500. Including a portion of the control flow relating solely to set-up allows greater flexibility for the creation of set-up procedures without burdening the system with computational cost that relates to including typical machine vision tasks.

If the key or gesture does not relate to a stop-run command, but instead relates to a set-up command, the set-up operation is performed 506, and control is passed to the portion of the control flow relating solely to set-up. Else, the gesture or key is not recognized, and another image is acquired 510.

Figure 6:
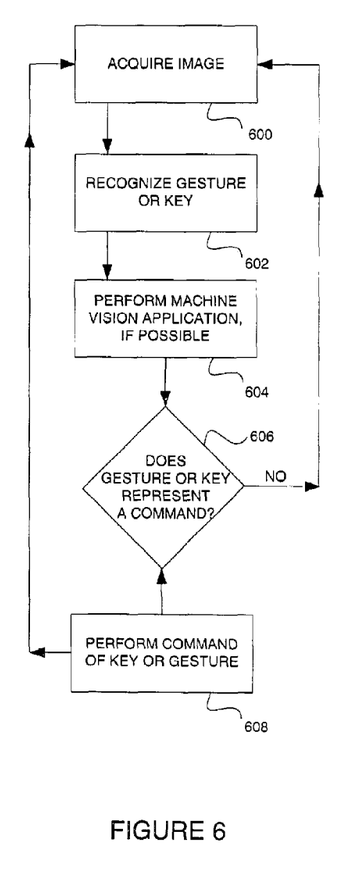
FIG. 6 is a flow chart of an alternate operation sequence of the control unit of FIG. 1.

With reference to FIG. 6 another control loop is described. First, an image is acquired 600. Next, upon each image acquisition, the system looks for the presence of a key or gesture in the field of view 602. In an alternative embodiment, the system looks for the presence of a key or gesture every N frames, where N depends on the application. In applications where processing power is limited, due to a computationally intensive vision algorithm and/or a fast-moving manufacturing process, N can advantageously be set to 2, 5, 10, or 20, for example.

Next, if there is a pending machine vision operation that needs to be performed on the image, that operation is performed 604. Then, if a key or gesture was recognized 602, then the command indicated by the key or gesture is performed 608. Otherwise, another image is acquired 600.

This loop runs continuously upon powering up the machine vision system. Other control loops are possible, and may be tailored to be optimized according to a particular application.

In other embodiments, a key and key recognizer may not be necessary if aspects of the image of the scene could be used to facilitate aperture and focus adjustments. In other embodiments, a gesture recognizer may not be necessary if the application can be controlled using only keys.

In an alternate embodiment, the breakout box 10 can be replaced with a video display. In other embodiments, a physical switch, such as on the breakout box, could be used to switch modes.

In another alternate embodiment, the gesture recognizer 22 and the key recognizer 24 may include a vision processor.

In an alternate embodiment, the apparatus includes a vision system having a camera and a vision processor cooperative with the camera, and at least one signaling element providing at least VALUE information to facilitate a user in setting up the vision system. For example, a vision system that has been pre-programmed to recognize small circles may still need its imaging characteristics, such as aperture and focus, optimized.

The key and/or gesture methods and apparatuses disclosed herein can also be used to facilitate golden template comparison inspections (GTC). In GTC inspections, many training images are used to create a golden template. Gestures and or keys can be used to communicate whether each image acquired of an object should be included or excluded in the creation of a golden template.

Other variants and embodiments will occur to those skilled in the art, without departing from the spirit and scope of the invention. Accordingly, the invention is not intended to be limited by the detailed description, except as set forth in the following claims.

What is claimed is:

1. Apparatus comprising:
   a gesture recognizer adapted to monitor gestures in a field of view of a camera, and adapted to provide control information in accordance with the monitored gestures to a vision system;
   a key recognizer adapted to monitor a key in a field of view of the camera and adapted to provide key information to the vision system;
   a breakout box having at least two signaling elements, one of the at least two signaling elements being configured to communicate to a human user system mode information, and another of the at least two signaling elements being configured to communicate to a human user numerical value information; and
   a setup control unit, cooperative with the gesture recognizer, the key recognizer, and the breakout box, the setup control unit being adapted to use the gesture control information and the key information to adjust a plurality of setup degrees of freedom of the camera, and adapted to provide the system mode information and the numerical value information to the breakout box.

2. The apparatus of claim 1, wherein the plurality of setup degrees of freedom are adjusted in a predetermined sequence.

3. The apparatus of claim 1, wherein the gestures in a field of view of the camera include:
   a hand moving right-to-left;
   a hand moving left-to-right; and
   a hand placed so as to substantially block the field of view of the camera.

4. The apparatus of claim 1, wherein the gestures in a field of view of
   the camera include:
   a wand moving right-to-left;
   a wand moving left-to-right; and
   a hand placed so as to substantially block the field of view of the camera.

5. The apparatus of claim 1, wherein the signaling elements are light emitting diodes (LEDs).

6. The apparatus of claim 1, wherein the signaling elements are audible tone emitters.

7. The apparatus of claim 1, wherein the signaling elements are numeric displays.

8. The apparatus of claim 1, wherein the key is a bar code symbol.

9. The apparatus of claim 1, wherein the key is a 2-dimensional data symbol.

10. Apparatus comprising:
    a signaling element, communicating at least numerical value information as feedback to a user as the user adjusts a degree of freedom of a camera, and
    a numerical value generator to generate the communicated at least numerical value information as a duty cycle value between 0 and 1, the duty cycle value controlling an output of the signaling element, the signaling element including at least one of a light emitter and a sound emitter.

11. The apparatus of claim 10, where the degree of freedom of the camera is focus.

12. The apparatus of claim 10, wherein the degree of freedom of the camera is aperture.

13. A system for industrial automation comprising:
    a training object in a field of view;
    a digital camera providing an image of the field of view;
    a signaling element communicating at least numerical value information as feedback to a user as the user adjusts at least one degree of freedom of the camera; and
    a digital image processing device connected to the camera configured to compute, using the image, the communicated at least numerical value information as a duty cycle value between 0 and 1, the duty cycle value controlling an output of the signaling element, the signaling element including at least one of a light emitter and a sound emitter.

14. The apparatus of claim 13, where the at least one degree of freedom of the camera is focus.

15. The apparatus of claim 13, wherein the at least one degree of freedom of the camera is aperture.

* * * * *